(12) United States Patent
Lor et al.

(10) Patent No.: US 7,836,488 B2
(45) Date of Patent: Nov. 16, 2010

(54) AUTHENTIC DEVICE ADMISSION SCHEME FOR A SECURE COMMUNICATION NETWORK, ESPECIALLY A SECURE IP TELEPHONY NETWORK

(75) Inventors: Kar-Wing Edward Lor, Castro Valley, CA (US); Yat Tung Cheung, Hong Kong SAR (CN); Wing Hei Luk, Hong Kong SAR (CN); Kwan Shum, Hong Kong SAR (CN)

(73) Assignee: Hong Kong Applied Science and Technology Research Institute Co. Ltd., Hong Kong SAR (CN)

( * ) Notice: Subject to any disclaimer, the term of this patent is extended or adjusted under 35 U.S.C. 154(b) by 1063 days.

(21) Appl. No.: 11/206,083

(22) Filed: Aug. 18, 2005

(65) Prior Publication Data

US 2007/0044141 A1    Feb. 22, 2007

(51) Int. Cl.
*H04L 9/32* (2006.01)
(52) U.S. Cl. .............................. 726/3; 726/27; 709/225; 709/229
(58) Field of Classification Search .................... 726/3, 726/27, 30; 713/155–159; 380/247–250; 709/225, 229
See application file for complete search history.

(56) References Cited

U.S. PATENT DOCUMENTS

| | | | |
|---|---|---|---|
| 6,721,555 B1 * | 4/2004 | Phillips et al. | 455/411 |
| 6,856,616 B1 | 2/2005 | Schuster et al. | |
| 7,266,113 B2 * | 9/2007 | Wyatt | 370/352 |
| 2003/0053421 A1 * | 3/2003 | Yoshimura | 370/254 |
| 2004/0148374 A1 * | 7/2004 | Bush et al. | 709/223 |
| 2004/0170198 A1 * | 9/2004 | Meggers et al. | 370/514 |
| 2004/0213260 A1 * | 10/2004 | Leung et al. | 370/395.3 |
| 2006/0200670 A1 * | 9/2006 | Kuffel et al. | 713/170 |

FOREIGN PATENT DOCUMENTS

| | | | |
|---|---|---|---|
| WO | 2004/057846 A1 | 7/2004 | |
| WO | 2004/064321 A1 | 7/2004 | |

OTHER PUBLICATIONS

International Search Report.

* cited by examiner

*Primary Examiner*—Benjamin E Lanier
*Assistant Examiner*—Hadi Armouche
(74) *Attorney, Agent, or Firm*—Buchanan Ingersoll & Rooney PC (57) ABSTRACT

An admission scheme is provided for selective admission of voice data packets to a voice network from a communication network having data and voice packets. The scheme can be implemented using a device such as a network switch. According to the admission scheme, the MAC address of a device is acquired and stored upon admission of the device to the voice network. The source MAC address of data packets is checked before the packets are admitted from the communication network to the voice network. A packet is admitted to the voice network only if the MAC address is registered with the voice network.

13 Claims, 4 Drawing Sheets

Fig. 1

Fig. 2 unique_ID: IP Phone's unique identification
x:         Challenge (random number)
auth_resp: Computed value from MAC, x and the
           authentication key

AUTHENTIC DEVICE ADMISSION SCHEME FOR A SECURE COMMUNICATION NETWORK, ESPECIALLY A SECURE IP TELEPHONY NETWORK

FIELD OF THE INVENTION

This invention relates to a device admission scheme for a communication network and, more particularly, to a device admission and re-authentication scheme for a packetized voice communication network, such as a VoIP telephony network.

BACKGROUND OF THE INVENTION

Private data networks are increasingly used to carry telephone services alongside ordinary data traffic in corporate environments to replace dedicated PBX systems. The use of private data networks for telephony service is advantageous because, for example, the voice system is more scalable and its management can be more efficient and centralised. In addition, only a single network infrastructure is required by both voice and data traffic. Voice telephony in private data network is usually carried by packetized voice data traffic and VoIP (Voice-over-Internet-Protocol) is the prevalent standard protocol, although the VoIP standard was originally developed for internet applications.

Figure 1:
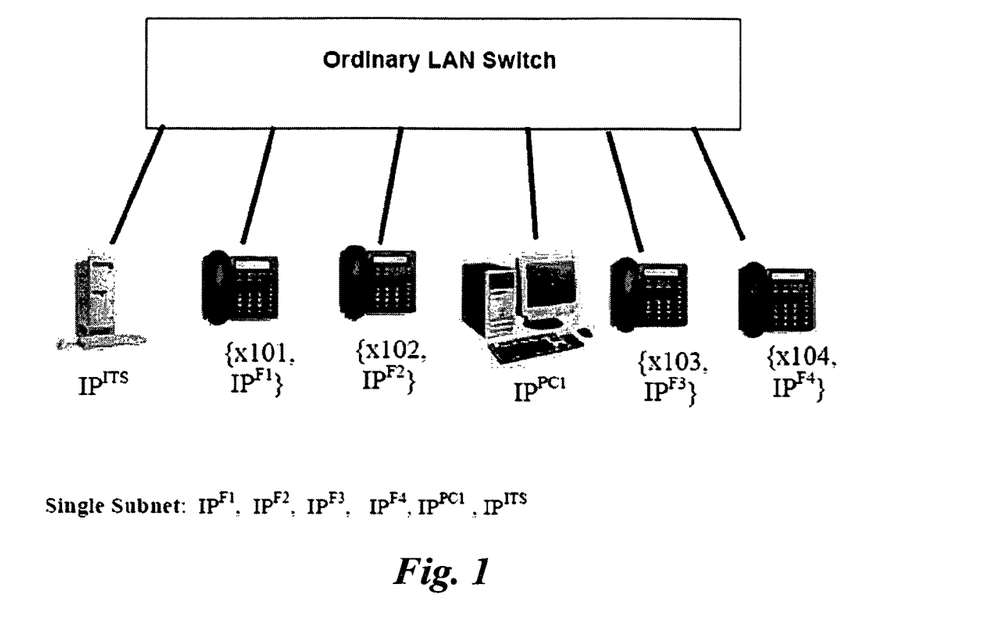
FIG. 1 shows an exemplary local area network (LAN) with converged data and VoIP applications connected to a conventional LAN switch and controlled by an IP telephony server.

An exemplary conventional VoIP voice communication network built on an exemplary Local Area Network (LAN) is shown in FIG. 1. This conventional network comprises a Layer 2 LAN switch, a plurality of IP phone devices and an IP telephony server (ITS). Each IP phone device has a characteristic IP address $IP^{Fx}$ and an internal phone extension number (for example, 101-104). The ITS is allocated an IP address ($IP^{ITS}$) and all the relevant network entities are connected to the LAN switch. Since all the entities are connected to the same data network, they are assigned IP addresses of the same IP subnet work. In this specification, the terms "client device", "phone device" and "IP phone" are used interchangeable and have the same meaning unless the context otherwise requires.

In a conventional private VoIP system such as that described above, voice and data traffic communicable at all Layers is carried by a single physical network infrastructure. Malicious attacks on the data network (for example, due to hacking) may simultaneously bring down the voice network. This is clearly not acceptable. To mitigate the risks of damage to the voice telephony system due to malicious attack on the data network, it is desirable that the voice telephony network and the data network of a corporate is separated. With the segregation of the voice network from the data network, data traffic and voice traffic will be carried separately on their respective networks so that non-voice data in the data network will not be allowed to cross into the voice network. This segregation will result in the creation of a "trusted network" for carrying voice traffic and an "untrusted network" for carrying ordinary data or a mixture of voice and data. In the unfortunate event that the untrusted data network is paralyzed by hackers, the trusted voice network can still remain operational due to their segregation.

To take advantage of a single physical network infrastructure, a physical LAN may be logically segregated into a voice network and a data network. Logical network segregation of a LAN into voice and data sub-LANs may be achieved by using Virtual LAN (VLAN) topology or other appropriate techniques. A description of appropriate VLAN techniques can be found in, for example, "IEEE Standard for Information technology—Telecommunications and information exchange between systems—IEEE standard for local and metropolitan area networks—Common specifications—Part 3: Media access control (MAC) Bridges, ANSI/IEEE Std 802.1D, 1998 Edition". This documentation is incorporated herein by reference.

In order to safeguard the integrity and security of a trusted voice network, each IP phone device has to be strictly authenticated before it is admitted into the trusted voice network. This initial admission authentication can follow known authentications methods such as those set out in IEEE standard 802.1X, which is incorporated herein by reference. Specifically, the IEEE 802.1X standard describes a standard method for port-based access of devices into a LAN and provides details on how a device can be granted admission into a LAN based on their network interface. The network interface of a network device is a physical interface commonly referred to as a port. U.S. Pat. No. 6,339,830 describes an admission authentication method which is a simplified variation of the 802.1X method. However, it is noted security afforded by initial admission authentication or like schemes are not adequate. Hence, it is desirable if means, methods and schemes for enhanced security of a trusted voice network can be provided.

Throughout this specification, the term "Layer" means and refers to a Layer as defined under the OSI (open system interconnection) protocol model, unless the context otherwise requires.

OBJECT OF THE INVENTION

Therefore, it is an object of this invention to provide security means, methods and schemes for enhancement of security of a trusted voice network. At a minimum, it is at least an object of this invention to provide a useful alternative of security means, methods and schemes for enhanced security of a VoIP telephony network for the choice of the public.

SUMMARY OF THE INVENTION

According to an aspect of this invention, there is provided an admission scheme for a communication network comprising the step of:—
 a). acquiring and storing the MAC address of a device on admitting the device to the communication network,
 b). checking the source MAC address of a data packet before said data packet is admitted into the communication network, and
 c). admitting a data packet into the communication network only if the MAC address is registered with the communication network.

Preferably, said security method further comprising the step of:—
 checking the traffic rate of a data packet before a data packet is admitted into the communication network, a data packet is allowed into the communication network only if its data rate does not exceed a prescribed maximum.

Preferably, an initial authentication is performed on a device on admission into said communication network.

Preferably, said security method further comprising the step of:—
 periodic re-authentication of said device.

Preferably, said initial authentication and re-authentication are based on IEEE 802.1X.

Preferably, Extended Authentication Protocol and its derivative protocols including Challenge Handshake Authentication Protocol is used in said initial authentication of a device for admission into said communication network.

Preferably, the MAC address of a device is acquired and registered in said voice network during said initial authentication of a device on its admission into the voice network, the registered MAC address of said device is used in said subsequent admission of traffic from the device into the network.

Preferably, upon detection of a change in the link states of a device in relation to said voice network, a set of authentication procedures is executed to verify the authenticity of a device, the set of authentication procedures is substantially identical to said set of initial admission authentication procedures except that no electronic key is acquired during said re-admission authentication procedures.

Preferably, the call control traffic data rate of a device is policed, a call control traffic data rate exceeding a predetermined threshold is blocked by said network.

Preferably, said threshold being a data rate between 10 kB/s to 10 MB/s.

Preferably, said security method further comprising the step of:—
periodically checking the MAC address of a device which is connected to the voice network, data packets from the device will be not be admitted if the MAC address of the device is not one which is already registered with the voice network.

Preferably, said communication network is a voice LAN comprising a switch and a plurality of ports, said switch monitors the link-state of said plurality of ports and activates said initial admission authentication procedures upon detection of a change in the link-state of said port.

Preferably, the MAC address of a device and the port address to which said device is connected is recorded by said switch upon execution of said initial authentication procedures, said MAC address and the corresponding port address are used in said subsequent admission of traffic from the device into the network.

Preferably, a communication network comprising an admission scheme of any of the preceding claims.

Preferably, said communication network is adapted for VoIP telephony.

DETAILED DESCRIPTION OF THE A PREFERRED EMBODIMENT

Before an IP phone device is admitted into a trusted communication network, for example, a secure VoIP telephony network, the IP phone device must be authenticated in accordance with a set of pre-admission authentication procedures to ensure that the IP phone device is legitimate to alleviate the risk of admitting a malicious device such as a hacking station impersonating an IP phone device. This is important since a malicious device admitted into a network may be used to launch attack against the ITS or other servers resident in the network which may lead to a system failure. Initial authentication of a device may be by known device authentication schemes or methods such as described in IEEE 802.1X, in U.S. Pat. No. 6,339,830, or other appropriate authentication methods available and/or invented from time to time. As a specific convenient example, for a system utilizing IEEE 802.1X authentication schemes, a device will be authenticated by following a standard procedure known as Extended Authentication Procedure (EAP) which is incorporated herein by reference.

However, a trusted network which relies merely on an initial device authentication scheme as the sole security measure is vulnerable. For example, the trusted network will not be aware of any subsequent changes of identity of a device after admission. A legitimate device may be replaced or hijacked by a malicious device after being admitted into the trusted network. As a convenient example, a hacking device can piggyback on an authenticated device in order to gain admission into the trusted network. Indeed, this is a known weakness of 802.1X.

To alleviate shortcomings of conventional authentication schemes for a trusted network, this invention provides a security scheme comprising post-admission authentication in addition to initial admission authentication. The initial admission authentication scheme can be performed according to IEEE 802.1X, U.S. Pat. No. 6,339,830 or other device admission authentication schemes available from time to time without loss of generality. To facilitate the implementation of the post admission authentication schemes of this invention, device identifications are acquired and stored within the trusted network at the time of performing admission authentication. In particular, the Layer 2 device address (commonly known as the MAC (Media Access Control) address) and the Layer 3 device address (also known as the IP address) are acquired and registered with the trusted network regardless of the type of initial admission authentication schemes. The registration of device identification characteristics can be done by control means of the trusted network. An exemplary control means can be an intelligent switch interconnecting the trusted and un-trusted networks. With this arrangement, the MAC and IP addresses of an admitted authentic device legitimately connected would be known by the trusted network.

Layer 2 Traffic Control

To enhance security of a trusted network, the trusted network is configured so that only packets from an authenticated device with a registered MAC address is allowed. To implement this, the trusted network controller examines each packet sent by a device and match with the registered MACs. If a packet is not sent by a device with a pre-registered MAC address, the packet will be blocked or rejected. In other words, packets from a device with a non-registered MAC address will not be allowed into the trusted network, but admitted into the untrusted network. In implementing this scheme, it will be noted that the number of devices associated with each network interface, that is, a port, is not limited to one and a plurality of devices can be connected to a single port. On the other hand, each device has a MAC address which is characteristic of a device. The MAC address can be utilized as identification means since it is not normally alterable. By utilising MAC address authentication as the additional post admission security measure, enhanced trusted network security can be accomplished.

Re-Authentication

In addition to checking the MAC of a packet sending device, the trusted network may perform additional post-admission checks on the devices. For example, after a device has been authenticated on admission, the trusted network can from time to time execute a re-authentication process to re-confirm the genuineness of the device being connected to a specific port. This re-authentication process may be a repeat of the initial device admission authentication scheme or similar authentication schemes. Re-authentication may take place periodically and/or after a device is re-connected (re-plugged) to the trusted network after disconnection (unplugging).

Layer 3 Traffic Rate Policing

Another post admission checking scheme that can be implemented in addition to the Layer 2 traffic control scheme is by way of traffic rate policing. After completion of the initial device admission and registration procedures, a phone device will have acquired a Layer 3 device address ("IP address") and the phone device will then be allowed to communicate with the IP telephony server (ITS), which can be, for example, a software running on the CPU of the intelligent switch. As telephony service of the trusted network is controlled by the ITS, CPU time of the intelligent switch is a precious resource. A hacking device may try to bring down the trusted network by occupying all the available resources of the CPU. This can be done, for example, by a phone device sending junk and bulky data to flood the CPU. To mitigate this risk, data flow from each phone device to the ITS is scrutinized and any abnormally high rate or volume of data flow will be curbed at the network interface. Since malicious data are usually disguised under the coat of call control traffic data, an exemplary security scheme is the policing of call control traffic from each IP Phone to the ITS. Specifically, call control traffic data exceeding a reasonable data rate will be rejected and the corresponding device will be disconnected. For example, voice call control traffic data towards the ITS exceeding 10 kB/s or other appropriate rates will be blocked. Optionally, the IP phone device will have to be re-authenticated for re-admission once abnormality is detected, otherwise, the IP phone will be disconnected. Where multiple authenticated IP Phones are admitted to a trusted network, individual policing rules or rates may be implemented for the respective ports.

It should be noted that the above post-admission checking schemes are just some examples which are non-restricting. In particular, the schemes can be utilized jointly, severally, or in combination as and when appropriate to accomplish the specific network security requirements.

An Exemplary Network Application

An exemplary preferred embodiment of this invention will be explained below with reference to an exemplary trusted network of FIG. 2. The trusted network of FIG. 2 comprises IP phone devices $IP^{F1}$, $IP^{F2}$, $IP^{F3}$ & $IP^{F4}$ which are respectively connected to ports F1, F2, F3 & F4 of the trusted network. The trusted network comprises an intelligent VoIP switch ($IP^{SW}$) which hosts the ITS. The trusted network also comprises an authentication server for authentication purposes. This authentication server may be internal or external to the intelligent switch.

Pre-Admission Authentication

In this application, a version of the standard Extended Authentication Protocol (EAP), namely, EAP-CHAP (Challenged Handshake Authentication Protocol), which is incorporated herein by reference, is used as an exemplary pre-admission authentication scheme for convenient illustration. However, it should be noted that other appropriate pre-admission authentication schemes known to persons skilled in the art could be used without loss of generality.

Figure 6:
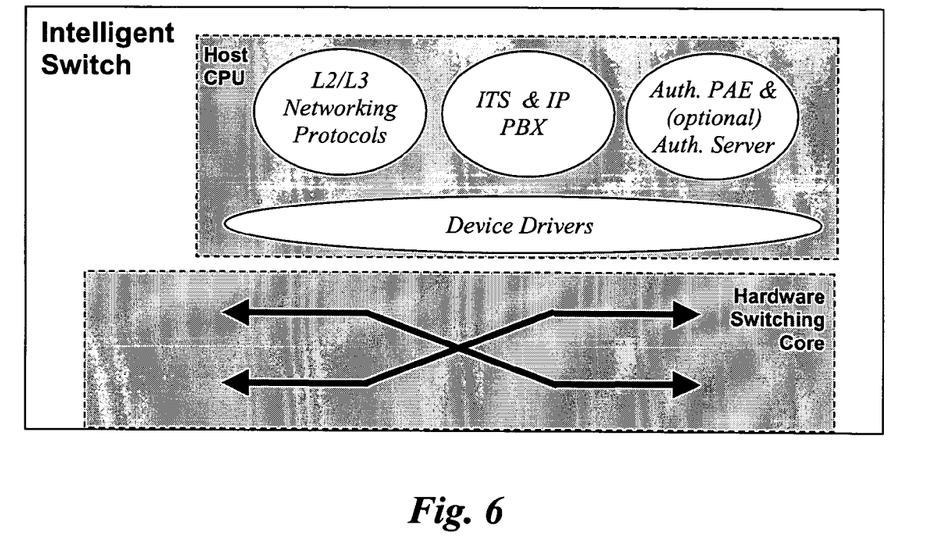
FIG. 6 is a schematic of an intelligent switch incorporating device admission scheme of this invention.

More particularly, the pre-admission authentication scheme to be illustrated in this example is substantially based on 802.1X. There are three parties in this method, namely, the Supplicant, the Authenticator Port Access Entity (PAE), and the Authentication Server. In this specific example, the IP phone device is a Supplicant and the intelligent switch is the Authenticator PAE. The pre-admission authentication process will be explained below with reference to FIG. 3. An example of an intelligent switch incorporating this invention is shown in FIG. 6.

Figure 3:
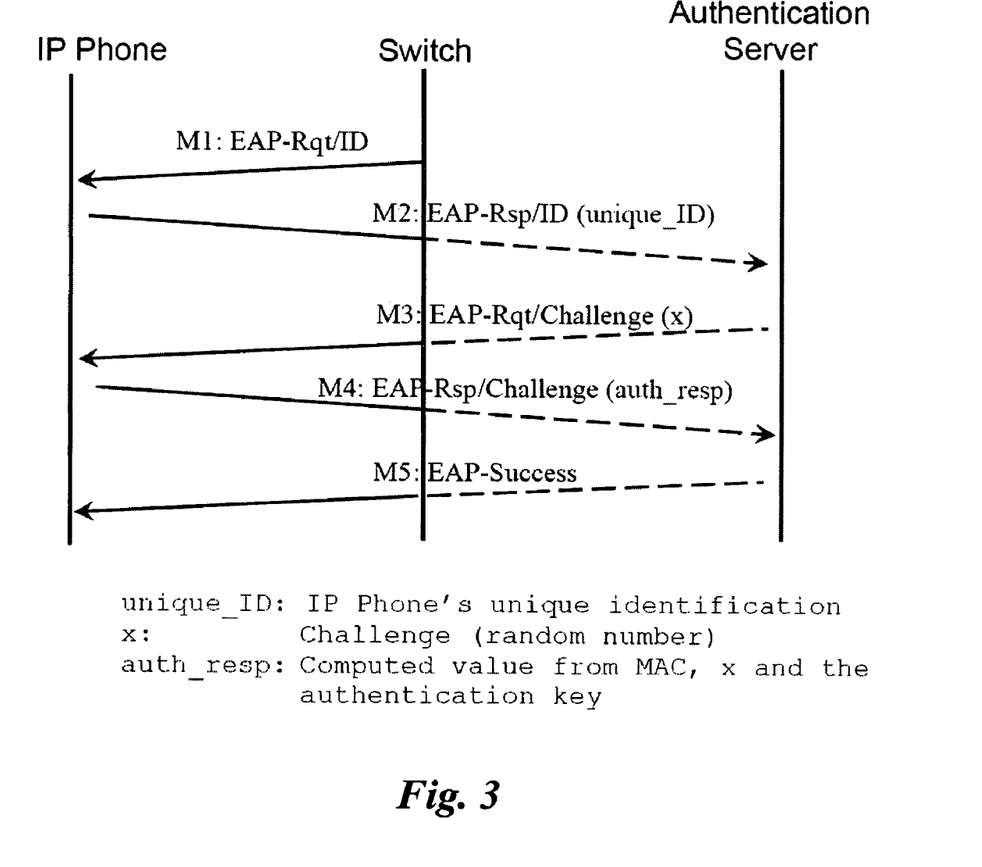
FIG. 3 shows an exemplary flow diagram of an initial device admission authentication scheme.

Firstly, when an IP phone is powered up and plugged into the network, which can be an Ethernet port on the intelligent switch, the intelligent switch will detect a change of the link-state at the port. This will kick-start the pre-admission authentication process.

Referring to FIG. 3, the switch will send an EAP-Request/Identity message to the IP Phone (M1). On receiving the EAP-Request/Identity message, the IP Phone will send an EAP/Response-Identity to the switch (M2) together with a unique identification. This unique identification (ID) can be, for example but not limited to, its Layer 2 device address (the MAC address), or its serial number. This unique identification (for example, the IP phone's MAC address) will be recorded by the switch for subsequent use. Next, the switch will then forward the EAP-Response/Identity to Authentication Server (M2). On receiving the EAP-Response/Identity, the Authentication Server will start a new authentication session. Specifically, it will record the unique ID in an identity field for subsequent use and generate an EAP-Request/Challenge message for returning to the switch (M3). This EAP-Request/Challenge message includes a random number (x). The switch will then forward the EAP-Request/Challenge message to the IP Phone (M3).

After the IP Phone has received the Challenge message, it will compute a response. The response is based on a unique, raw key associated with the phone. For example, the IP phone can acquire the key from a manually entered password or from an external secure device, such as, for example, a hardware plug-in key or smartcard. An encrypted form of the key (eKey) will then be computed, in the form of the function below:—

$$eKey = ef1(key, unique\_ID)$$

where "key" is the unique, raw key associated with the phone,

"unique_ID" is the unique identification of the phone, and

"ef1" is a computation with encryption.

With the eKey, an authentication response can be computed along with the challenge value originated from the authentication server. The authentication response will be computed by the following formula:

$$auth\_resp = ef2(eKey, x)$$

where "x" is the challenge value, and

"ef2" is a computation with encryption.

The authentication response (auth_resp), which is also in encrypted form as an electronic key ("eKey"), will be sent back to the switch (M4) as well as being stored in the IP Phone. This stored eKey can be used for subsequent IP phone authentication with the Authentication Server without the need of another key acquisition. An encrypted form of the key is preferred because it will enhance security and prevent a malicious user from reading the key from the phone hardware.

Next, the switch will forward auth_resp to the Authentication Server (M4). On receiving the EAP-Response/Challenge response, the Authentication Server will take the following steps to verify the authentication response:
  a) to calculate the eKey, this calculation can be based on the phone's unique ID and its associated key, which can be retrieved from the storage of the Authentication Server,
  b) to calculate the expected response based on the eKey and the challenge value of the IP phone device;
  c) to compare authentication response with the expected response.

Successful Authentication

If the authentication response matches with the expected response, the authentication process is successful. The Authentication Server will then send an "EAP-Success" message back to the switch (M5). On receiving the EAP-Success message, the switch will register and record the MAC address of the successfully authenticated IP Phone. For example, the MAC address can be stored in a network data storage or memory area. The memory area is assigned a name called the VoiceMAC Table for convenience. The switch will then forward the EAP-Success message back to IP Phone. Subsequently, packets entering the switch from the port with the registered MAC address will be admitted into the trusted voice network. On receiving EAP-Success, the IP Phone is ready to be used. Hence, it will be appreciated that, upon successful authentication, which will be evident by the issue and receipt of the EAP-success message, the MAC address of the IP phone will be registered in the VoiceMAC Table and mapping between the switch port and authenticated MAC address will also be stored.

Authentication Failure

On the other hand, if the authentication response does not match the expected response, the authentication process is unsuccessful. The Authentication Server will then return an "EAP-Failure" message to the switch. When the switch receives the EAP-Failure message, it will pass the EAP-Failure message onto the IP Phone. On receiving EAP-Failure, the IP Phone will try the authentication process again pursuant to the EAP standard which recommends at least 3 attempts of the authentication process before rejecting the admission request of a device. Of course, the number of allowable attempts can be set by the trusted network system administrator.

As the switch is responsible for part of the authenticating process as well as serving as a proxy to relay the EAP messages between the IP phone device and the Authentication Server, the switch is required to keep track on the various states of the message exchange. To fulfill its authentication role, the switch is installed with an 802.1X Authenticator PAE.

Post-Admission Checks a) Layer 2 Traffic Control

After an IP phone device has been admitted, its MAC address will have been registered with the trusted network. After admission, only data packets originating from a device of registered MAC address will be admitted into a trusted network. As a MAC address is a unique identification of a physical device under normal circumstances, a MAC-address based security scheme will mitigate the risk of device impersonating or port hijacking by a malicious entity.

Figure 2:
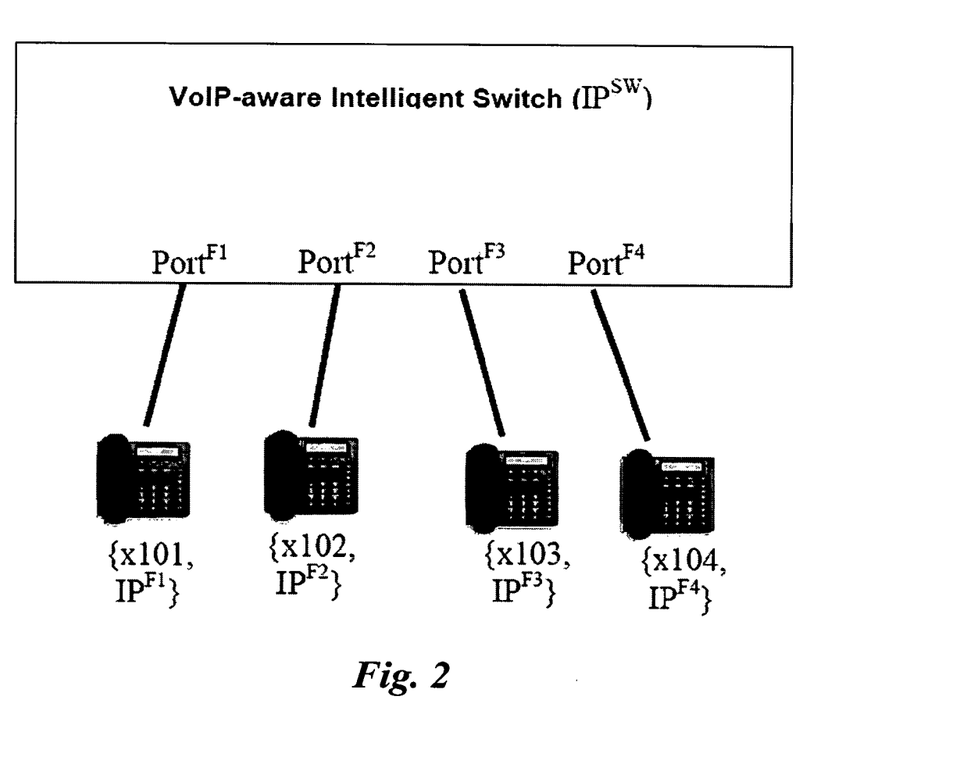
FIG. 2 shows an exemplary schematic trusted network connected with IP phone devices.

In the instantaneous exemplary network application, a physical LAN is logically segregated into a voice VLAN (trusted) of FIG. 2 and a data VLAN (untrusted). Only data packets originating from a registered MAC address will be eligible for the trusted network. Data packets from any other MAC address will be classified for the untrusted network. When packets seek entry into the trusted network, port ingress processing means of the trusted network switch will examine the incoming packets and classify the packets accordingly. Table 1 below shows the tabulation of four VLAN classification possibilities when a packet arrives at a switch port of the trusted network.

TABLE 1

| Packet's MAC address = Registered trusted MAC address? | Packet tagged? | Packet's VLAN ID = Voice VLAN's ID? | Result |
|---|---|---|---|
| yes | N/A | N/A | Classify packet into Voice VLAN |
| no | yes | yes | Drop packet, potential hazard as a non-trusted device tries to be classified into the Voice VLAN |
| no | yes | no | No VLAN classification is needed; packet is considered a data VLAN packet |
| no | no | N/A | Classify packet into data VLAN based on its ingress port |

Referring to FIG. 3, when an incoming packet arrives at the port ingress of the switch of the trusted network, a VLAN classification will be performed. This VLAN classification can be, for example, port-based, MAC-address based or by its original VLAN tag. After VLAN classification, the packet will be subject to a resolution logic engine which will examine the Layer 2 and/or Layer 3 characteristics to decide to which egress port the packet will be switched and sent out. After that, the packet will be forwarded to a packet filtering means to execute additional packet forwarding policies beyond the Layer 2/3 processing. If a packet successfully passes all the ingress processing procedures, it will be output to the port egress for entry into the trusted network.

Figure 4:
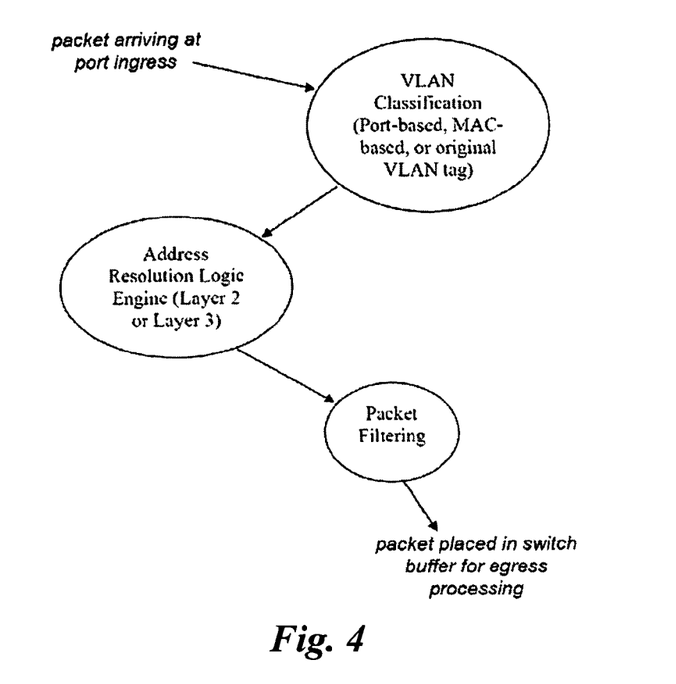
FIG. 4 shows an exemplary flow diagram of incoming packets security check for a preferred embodiment.
Figure 5:
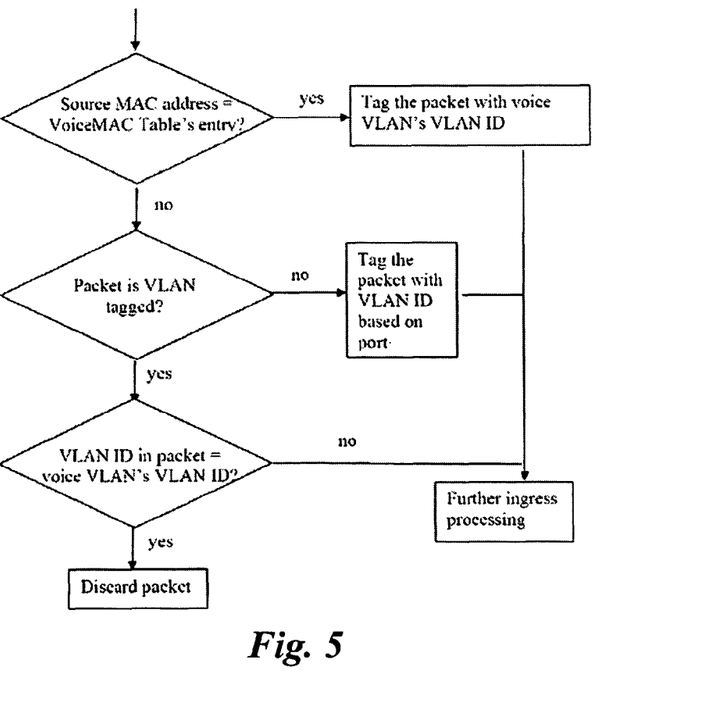
FIG. 5 shows an exemplary VLAN classification flow chart in relation to Table 1.

Referring to FIG. 4 in which the VLAN classification process of FIG. 3 is shown in more detail. Firstly, the MAC address accompanying a data packet will be examined. If the MAC address matches with one which is already registered in the VoiceMAC table, this will be classified as a legitimate voice data packet. This packet will then be tagged with the VLAN ID of the voice VLAN and will be forwarded to the next ingress processing step. If the outcome of the MAC address matching is negative, the packet will be examined for its VLAN tag. If there is no VLAN tag, the packet will be tagged with the VLAN ID based on the incoming port and then forwarded to the next ingress processing step for further processing. If the packet is already VLAN tagged, the VLAN ID of the data packet will be checked with the VLAN ID of the voice VLAN. If the VLAN ID of the data packet matches with that of the voice VLAN ID while the accompanying MAC address is not one which is already registered with the trusted network, this will suggests a potentially hazardous suspicious data packet from the untrusted network which is trying to be classified into the trusted network. Such a packet will be blocked from the trusted network and discarded. On the other hand, if the VLAN ID differs from that of the voice VLAN, the packet will be forwarded to the next ingress progressing step.

b) Layer 3 Traffic Policing

As mentioned above, after an IP phone device has been admitted into the trusted network, it will acquire an IP address. To alleviate the risks that a trusted network could be brought down by a malicious entity by hogging all the available operation control resources of the trusted network, Layer 3 traffic, especially but not limited to call control traffic from an IP phone device, is rate policed. For example, in a standard VoIP network, call control traffic typical includes a well known port ("WKP") in the field of destination TCP/UDP port in the packet header. Examples of WKP for some widely used VoIP protocols are as follows.

| Protocols | Typical Well Known Port |
|---|---|
| H.323 (call control - H.225) | 1720 |
| Session Initiation Protocol (SIP) | 5060 |
| Media Gateway Control Protocol (MGCP) | 2427 |

In the exemplary network configuration of FIG. 2, there are four IP phones connected to the trusted voice network. The extension numbers and IP addresses of the IP phones are in the form of $\{xi, IP^{Fi}\}$, where $1 \leq i \leq 4$, as shown in FIG. 2. Data rate policing rules are set up in the switch to match specific fields in the IP packet header. For example, when data packets arrive at a physical port $Port^{F1}$ with source $IP=IP^{F1}$, destination $IP=IP^{SW}$ and destination TCP/UDP port=$Pt^{wkp}$, the maximum data rate limit of the traffic is set to $N^{police1}$ kbps, where $N^{police1}$ is typically in the range of 10-1000. The matched packets are then subject to rate policing.

Likewise, for data packets arriving at respectively at physical ports $Port^{F2}$, $Port^{F3}$ & $Port^{F4}$ with their respective source IP being $IP^{F2}$, $IP^{F3}$ & $IP^{F4}$, destination $IP=IP^{SW}$ and destination TCP/UDP port=$Pt^{wkp}$, the maximum allowable rate is also $N^{police1}$ kbps. Of course, the network administrator may set or allocate different limits of allowable rates for different IP phone devices to increase flexibility. This rule matching and the subsequent policing actions are carried out in the "packet filtering" step in the ingress processing step of FIG. 4.

c) Periodic Re-Authentication

After a device has been authenticated and admitted into the trusted network, it may be re-authenticated periodically to ensure that it is the same genuine device which was originally plugged into the network switch. The re-authentication process may be identical to the initial device admission authentication process, although the key acquisition phrase can be waived since the key, whether encrypted or not, is already stored in the genuine IP phone device.

Similarly, if a device is unplugged from a network switch and subsequently re-plugged, it will also go through the post-admission device re-authentication process to mitigate the risk of a malicious device being plugged into the trusted network as a replacement.

The post-admission device re-authentication process will also be enforced when a phone is relocated, i.e. when a phone is unplugged from one switch port and plugged into another port. Specifically, when an IP Phone is reconnected to the same switch, after checking {switch port, IP phone's MAC address} mapping table, the switch will automatically de-register the MAC address from the old port, i.e. remove the entry from the VoiceMAC Table. On the other hand, if the IP Phone is reconnected to another switch, the MAC address registered on the old port will be de-registered during the next periodic re-authentication step. Optionally, a user interface tool may be provided for manually de-registering a trusted MAC address at a specific port. After a successful authentication, the IP Phone's MAC address will be registered with the new port.

Similarly, a post admission authentication procedure may be triggered by other events. For example, when an IP phone is powered up and plugged in into a port of the network switch such that a link-state change is detected at the Ethernet port of the switch, or when the network switch is booted up after a maintenance shutdown in which case all phones already connected to it will be authenticated again.

Although the above post-admission security schemes have been described with reference to the network of FIG. 2 as a convenient example, it will be appreciated by persons skilled in the art that the individual security schemes can be applied independently, whether jointly, severally or in combination without loss of generality. In other words, one or a plurality of the post-admission checking schemes can be elected for use with a specific network as and when desired.

While this invention has been explained by reference to the above examples or preferred embodiments in detail, it will be appreciated that the embodiments and their details are only examples to assist understanding of the invention and shall not be construed as limiting its scope. More particularly, variations, modifications and improvements to the preferred embodiments which are obvious and/or trivial to persons skilled in the art should be considered as an equivalence to the invention. Furthermore, while the present invention has been explained by reference to a VLAN and VoIP system, it should be appreciated that the invention can apply, whether with or without modification, to other communication networks including voice-over-packet communication systems without loss of generality.

The invention claimed is:

1. An admission scheme control device for selectively admitting voice data packets generated by a pre-authenticated voice device into a packetized voice communication network from a into a Voice-Over-Internet-Protocol communication network and into a network external of the Voice-Over-Internet-Protocol communication network, said packetized voice communication network being composed comprised of a plurality of pre-authenticated voice Voice-Over-Internet-Protocol devices each having a MAC address and said network external to said Voice-Over-Internet-Protocol communication network is an untrusted network comprised of a plurality of non-authenticated Voice-Over-Internet-Protocol devices, the admission scheme, comprising control device executing the steps of:

receiving data packets from a communication network carrying voice data packets and other packet traffic, said each voice data packets each packet including a MAC address indicative of the source device of said voice data packet;

checking a traffic rate of the voice data packets from at least one of the plurality of pre-authenticated Voice-Over-Internet-Protocol devices, admitting voice data packets into the Voice-Over-Internet-Protocol communication network if the traffic rate of the checked voice data packets from at least one of the plurality of pre-authenticated Voice-Over-Internet-Protocol devices does not exceed a prescribed maximum, where the voice data packets have a MAC address corresponding to that of a respective pre-authenticated device of the plurality of pre-authenticated devices, into the packetized voice communication network and admitting data packets into a communication network external of the Voice-Over-Internet-Protocol communication network where the data packets have a non-corresponding MAC address, wherein if the traffic rate of the checked voice data packets exceeds the prescribed maximum, a corresponding originating device of the checked packets is disconnected from the packetized voice Voice-Over-Internet-Protocol communication network and re-authenticated.

2. The admission control device according to claim 1, wherein an initial authentication is performed on a voice device on admission into said Voice-Over-Internet-Protocol communication network.

3. The admission control device according to claim 2, further comprising the step of:
periodic re-authentication of said voice device.

4. The admission control device according to claim 3, wherein said initial authentication and re-authentication are based on IEEE 802.1x.

5. The admission control device according to claim 3, wherein a Challenge Handshake Authentication Protocol is used in said initial authentication of a voice device for admission into said Voice-Over-Internet-Protocol communication network.

6. The admission control device according to claim 2, wherein the MAC address of a device is acquired and registered in said Voice-Over-Internet-Protocol communication network during said initial authentication of a device on its admission into the Voice-Over-Internet-Protocol communication network, the registered MAC address of said device is used in said subsequent admission of traffic from the device into the network.

7. The admission control device according to claim 6, wherein upon detection of a change in the link states of a voice device in relation to said Voice-Over-Internet-Protocol communication network, a set of authentication procedures is executed to verify the authenticity of a device, the set of authentication procedures is substantially identical to said set of initial admission authentication procedures except that no electronic key is acquired during said re-admission authentication procedures.

8. The admission scheme control device according to claim 1, wherein a threshold rate includes a traffic rate between 10 kB/s to 10 MB/s.

9. The admission control device according to claim 2, further comprising the step of:
periodically checking the MAC address of an authenticated device which is connected to Voice-Over-Internet-Protocol communication network, data packets from the device will be not be admitted if the MAC address of the device is not one which is already registered with the Voice-Over-Internet-Protocol communication network.

10. The admission control device according to claim 1, wherein said Voice-Over-Internet-Protocol communication network is a voice LAN comprising a switch and a plurality of ports, each of said plurality of ports having a port address and an associated port number, said switch monitors the link-state of said plurality of ports and activates said initial admission authentication procedures upon detection of a change in the link-state of said port.

11. The admission control device according to claim 10, wherein the MAC address of a device and the physical port number to which said device is connected is recorded by said switch upon execution of said initial authentication procedures, said MAC address and the corresponding physical port number are used in said subsequent admission of traffic from the device into the Voice-Over-Internet-Protocol communication network.

12. A communication network system, said network system including
a voice data network admission scheme control device for admitting a voice data packet generated by a pre-authenticated voice device into a packetized voice Voice-Over-Internet-Protocol communication network from a communication network, said packetized voice Voice-Over-Internet-Protocol communication network being composed of a plurality of pre-authenticated voice devices each having a MAC address, said admission scheme including control device executing the steps of:
receiving data packets from a communication network carrying voice data packets and other traffic, each voice data packet including a MAC address indicative of the source device of said voice data packet;
checking a traffic rate of the voice data packets from at least one of the plurality of pre-authenticated Voice-Over-Internet-Protocol devices; and
admitting voice data packets into the Voice-Over-Internet-Protocol communication network if the traffic rate of the checked voice data packets from at least one of the plurality of pre-authenticated Voice-Over-Internet-Protocol devices does not exceed a prescribed maximum, where the voice data packets have a MAC address corresponding to that of a respective pre-authenticated device of the plurality of pre-authenticated devices, and admitting data packets into a communication network external of the Voice-Over-Internet-Protocol communication network where the data packets have a non-corresponding MAC address,
wherein if the traffic rate of the checked voice data packets exceeds the prescribed maximum, a corresponding originating device of the checked packets is disconnected from the packetized voice Voice-Over-Internet-Protocol communication network and re-authenticated.

13. The communication system of claim 12, wherein said communication network is adapted for VoIP telephony.

* * * * *